US012673385B2

(12) United States Patent
Inoue et al.

(10) Patent No.: US 12,673,385 B2
(45) Date of Patent: Jul. 7, 2026

(54) LASER MACHINING HEAD AND LASER MACHINE

(71) Applicant: Mitsubishi Electric Corporation, Tokyo (JP)

(72) Inventors: Yoko Inoue, Tokyo (JP); Masaki Seguchi, Tokyo (JP); Tomohiro Kyoto, Tokyo (JP); Yukiatsu Kato, Tokyo (JP); Akinori Nishio, Tokyo (JP); Mototoshi Kumaoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/876,301

(22) PCT Filed: Jul. 15, 2022

(86) PCT No.: PCT/JP2022/027883
§ 371 (c)(1),
(2) Date: Dec. 18, 2024

(87) PCT Pub. No.: WO2024/013986
PCT Pub. Date: Jan. 18, 2024

(65) Prior Publication Data
US 2025/0170674 A1     May 29, 2025

(51) Int. Cl.
*B23K 26/064*     (2014.01)
*B23K 26/073*     (2006.01)
*B23K 26/36*      (2014.01)

(52) U.S. Cl.
CPC ...... *B23K 26/0648* (2013.01); *B23K 26/0734* (2013.01); *B23K 26/36* (2013.01)

(58) Field of Classification Search
CPC .. B23K 26/06; B23K 26/064; B23K 26/0648; B23K 26/0734
See application file for complete search history.

(56) References Cited

U.S. PATENT DOCUMENTS 4,275,288 A * 6/1981 Makosch ............. B23K 26/073
219/121.75
5,256,853 A 10/1993 McIntyre
(Continued)

FOREIGN PATENT DOCUMENTS

CN        111323928 A * 6/2020 ......... B23K 26/0648
DE 102007018400 B4 * 4/2009 ......... B23K 26/0652
(Continued)

OTHER PUBLICATIONS

CN 111323928 A (Li, Si-Jia) Jun. 23, 2020 [retrieved on Mar. 13, 2025]. Retrieved from Espacenet Database, translation by EPO and Google (Year: 2020).*

(Continued)

*Primary Examiner* — Edward F Landrum
*Assistant Examiner* — Theodore J Evangelista
(74) *Attorney, Agent, or Firm* — XSENSUS LLP

(57) ABSTRACT

A laser machining head includes: a first lens group in which laser light diverging from a light emitter enters and is concentrated; a second lens group to which the laser light having passed through the first lens group propagates; a third lens group that constitutes a lens group in which the laser light having passed through the second lens group propagates and forms an image of the light emitter; a fourth lens group in which the laser light having passed through the third lens group enters and is concentrated; a light flux conversion optical element that is disposed on an optical axis between the first lens group and the second lens unit and converts a beam mode of the laser light; a first mover that moves the first lens group in an optical axis direction; and a second mover that moves the third lens group in an optical axis direction.

10 Claims, 11 Drawing Sheets

(56)                References Cited

U.S. PATENT DOCUMENTS

| | | | |
|---|---|---|---|
| 2010/0174273 | A1 | 7/2010 | Murakami |
| 2019/0062196 | A1 | 2/2019 | Bui |
| 2019/0084082 | A1* | 3/2019 | Ito .................... B23K 26/046 |

FOREIGN PATENT DOCUMENTS

| | | | | |
|---|---|---|---|---|
| JP | 2005-028428 | A | 2/2005 | |
| JP | 2009-186936 | A | 8/2009 | |
| JP | 2019-042793 | A | 3/2019 | |
| JP | 2020-531392 | A | 11/2020 | |
| JP | 6833117 | B1 | 2/2021 | |
| WO | WO-2017203613 | A1 * | 11/2017 | ........... B23K 26/046 |
| WO | 2021166037 | A1 | 8/2021 | |

OTHER PUBLICATIONS

WO 2017203613 A1 (Inoue, Y) Nov. 30, 2017 [retrieved on Mar. 13, 2025]. Retrieved from Foreign Image and Text database, translation by Clarivate Analytics (Year: 2017).*
DE 102007018400 B4 (Schnitzler, Claus) Apr. 2, 2009 [retrieved on Jun. 26, 2025]. Retrieved from Espacenet Database, translation by EPO and Google (Year: 2009).*
International Search Report and Written Opinion mailed on Oct. 4, 2022, received for PCT Application No. PCT/JP2022/027883, filed on Jul. 15, 2022, 8 pages including English Translation.
Decision to Grant a Patent mailed on Jan. 10, 2023, received for JP Application 2022-574590, 05 pages including English Translation.
Office Action mailed on Mar. 24, 2025 for corresponding German patent application No. 11 2022 007 130.3 (12 1 pages; with English machine translation).

* cited by examiner

LASER MACHINING HEAD AND LASER MACHINE

CROSS-REFERENCE TO RELATED APPLICATION

The present application is based on PCT filing PCT/JP2022/027883, filed Jul. 15, 2022, the entire contents of which are incorporated herein by reference.

FIELD

The present disclosure relates to a laser machining head that emits laser light and a laser machine.

BACKGROUND

In laser machining using laser light, it is expected that high-quality machining can be performed or machining can be performed with high efficiency, on workpieces of various materials or various thicknesses. Therefore, the laser machine is required to appropriately control a beam diameter of a laser beam at a condensing position or appropriately control a beam mode which is an intensity distribution of the laser beam in a cross section of the laser beam. In machining of a medium-thickness plate, it is required to form a laser beam having high intensity at an outer edge portion of the laser beam, that is, a laser beam of a so-called ring-shaped beam mode, and to increase a beam diameter.

Patent Literature 1 discloses a laser processing machine including two axicon lenses and a moving mechanism that moves each axicon lens in an optical axis direction, in which the laser processing machine switches a beam mode by changing a distance between the axicon lenses. In the laser processing machine according to Patent Literature 1, laser light emitted from a light emitter in a laser machining head passes through the two axicon lenses and a condenser lens, and is concentrated such that an image transfer position of the light emitter is located on or near a surface of a workpiece.

CITATION LIST

Patent Literature

Patent Literature 1: Japanese Patent Application Laid-open No. 2019-42793

SUMMARY OF INVENTION

Problem to be Solved by the Invention

According to the technique described in Patent Literature 1, a ring-shaped beam mode is obtained at a position away from the transfer position in the optical axis direction, but the ring-shaped beam mode is not obtained at the transfer position. Furthermore, according to the technique described in Patent Literature 1, in order to increase a beam diameter in the ring-shaped beam mode, it is necessary to greatly shift a position of the workpiece from the transfer position. By largely shifting the position of the workpiece from the transfer position, an edge of the laser beam on the workpiece is blurred, so that machining quality is deteriorated. For this reason, the conventional technique described in Patent Literature 1 has a problem that it is difficult to achieve high-quality machining by beam mode conversion.

The present disclosure has been made in view of the above, and an object of the present disclosure is to obtain a laser machining head capable of achieving high-quality machining by beam mode conversion.

Means to Solve the Problem

To solve the above problems and achieve the object, a laser machining head according to the present disclosure includes: a first lens group to which laser light diverging from a light emitter enters and configured to concentrate laser light; a second lens group to which the laser light having passed through the first lens group propagates; a third lens group to constitute, together with the second lens group, a lens group configured to form an image of the light emitter at a transfer position, wherein the laser light having passed through the second lens group propagates to the lens group; a fourth lens group to which the laser light having passed through the third lens group enters and configured to concentrate the laser light; a light flux conversion optical element disposed on an optical axis between the first lens group and the second lens group and configured to convert a beam mode of the laser light; a first mover configured to move the first lens group in an optical axis direction; and a second mover configured to move the third lens group in an optical axis direction.

Effects of the Invention

A laser machining head according to the present disclosure exhibits an effect of achieving high-quality machining by beam mode conversion.

DESCRIPTION OF EMBODIMENTS

Hereinafter, a laser machining head and a laser machine according to embodiments will be described in detail with reference to the drawings.

First Embodiment

Figure 1:
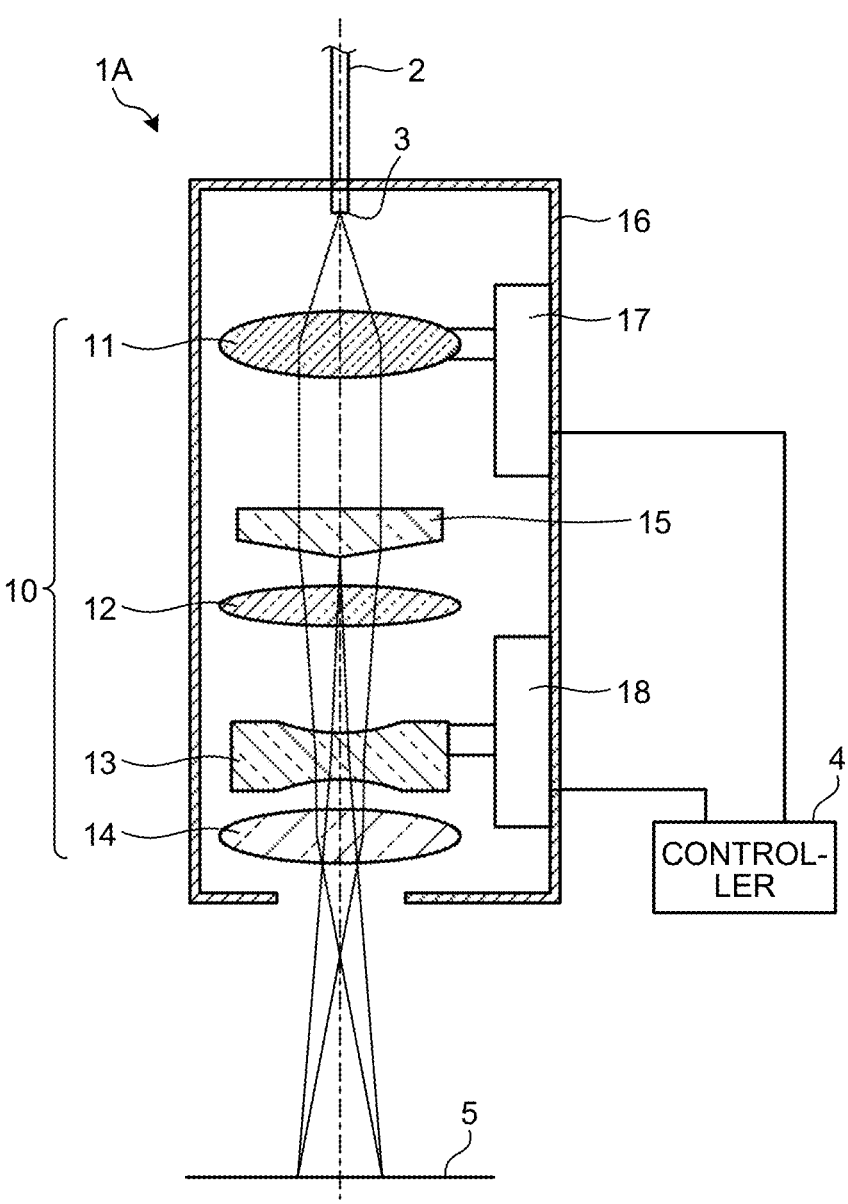
FIG. 1 is a diagram illustrating an exemplary configuration of a laser machining head according to a first embodiment.

FIG. 1 is a diagram illustrating an exemplary configuration of a laser machining head 1A according to a first embodiment. The laser machining head 1A is provided in a laser machine. The laser machining head 1A emits a laser beam toward a workpiece 5. The workpiece 5 is a metal plate. As a material of the workpiece 5, a metal material such as iron, stainless steel, or brass is used. Note that, a material of the workpiece 5 and a shape of the workpiece 5 are not limited to those described in the first embodiment.

A transmission cable 2 is a transmission path of laser light from a light source to the laser machining head 1A. The transmission cable 2 is, for example, an optical fiber. In FIG. 1, illustration of the light source is omitted. The laser machining head 1A includes a housing 16 constituting an outer shell of the laser machining head 1A. FIG. 1 schematically illustrates configurations accommodated in the housing 16. A light emitter 3 which is an emitting end of the transmission cable 2 is connected to an inside of the housing 16. Laser light propagated through the transmission cable 2 enters the housing 16.

The laser machining head 1A includes: a first lens group 11; a second lens group 12; a third lens group 13; a fourth lens group 14; and a light flux conversion optical element 15. The first lens group 11, the second lens group 12, the third lens group 13, the fourth lens group 14, and the light flux conversion optical element 15 are accommodated in the housing 16. The first lens group 11, the second lens group 12, the third lens group 13, and the fourth lens group 14 constitute a transfer optical system 10 which transfers an image of the light emitter 3. When the light flux conversion optical element 15 exists on an optical axis, the light flux conversion optical element 15 is also included in the components of the transfer optical system 10.

The first lens group 11 is a lens group having positive power. Laser light diverging from the light emitter 3 enters the first lens group 11 and is concentrated. The second lens group 12 is a lens group having positive power. Laser light having passed through the first lens group 11 propagates to the second lens group 12.

The third lens group 13 is a lens group having negative power. Laser light having passed through the second lens group 12 propagates to the third lens group 13. The second lens group 12 and the third lens group 13 constitute a lens group that forms an image of the light emitter 3 at a transfer position. The fourth lens group 14 is a lens group having positive power. Laser light having passed through the third lens group 13 enters the fourth lens group 14 and is concentrated. Laser light having passed through the fourth lens group 14 is emitted to an outside of the housing 16.

The light flux conversion optical element 15 is disposed on an optical axis between the first lens group 11 and the second lens group 12. In the first embodiment, the optical axis is an optical axis of the transfer optical system 10. The light flux conversion optical element 15 converts a beam mode of laser light. In the first embodiment, the light flux conversion optical element 15 is an axicon lens. The axicon lens includes a conical surface that is a conical convex surface and a plane on a side opposite to the conical surface. The light flux conversion optical element 15 converts a Gaussian beam into a ring-shaped beam. By disposing the light flux conversion optical element 15 on the optical axis, the laser machining head 1A generates a ring-shaped beam mode at the transfer position or in the vicinity of the transfer position. In the example illustrated in FIG. 1, it is assumed that the transfer position coincides with a position on the workpiece 5.

The laser machining head 1A includes a first mover 17 and a second mover 18. The first mover 17 moves the first lens group 11 in the optical axis direction. The second mover 18 moves the third lens group 13 in the optical axis direction.

A controller 4 controls the entire laser machine including the laser machining head 1A. The controller 4 transmits a control signal to each of the first mover 17 and the second mover 18. The first mover 17 moves the first lens group 11 in response to the control signal. The second mover 18 moves the third lens group 13 in response to the control signal. The controller 4 controls the first mover 17 and the second mover 18 by sending a control signal to each of the first mover 17 and the second mover 18.

In FIG. 1, each of the first lens group 11, the second lens group 12, the third lens group 13, and the fourth lens group 14 is illustrated as a single lens. Each of the first lens group 11, the second lens group 12, the third lens group 13, and the fourth lens group 14 is not limited to a single lens, and may include a plurality of lenses. The number of lenses in each of the first lens group 11, the second lens group 12, the third lens group 13, and the fourth lens group 14 may be any number.

Next, an operation of the laser machining head 1A when converting a beam mode of a laser beam emitted from the laser machining head 1A will be described.

Figure 2:
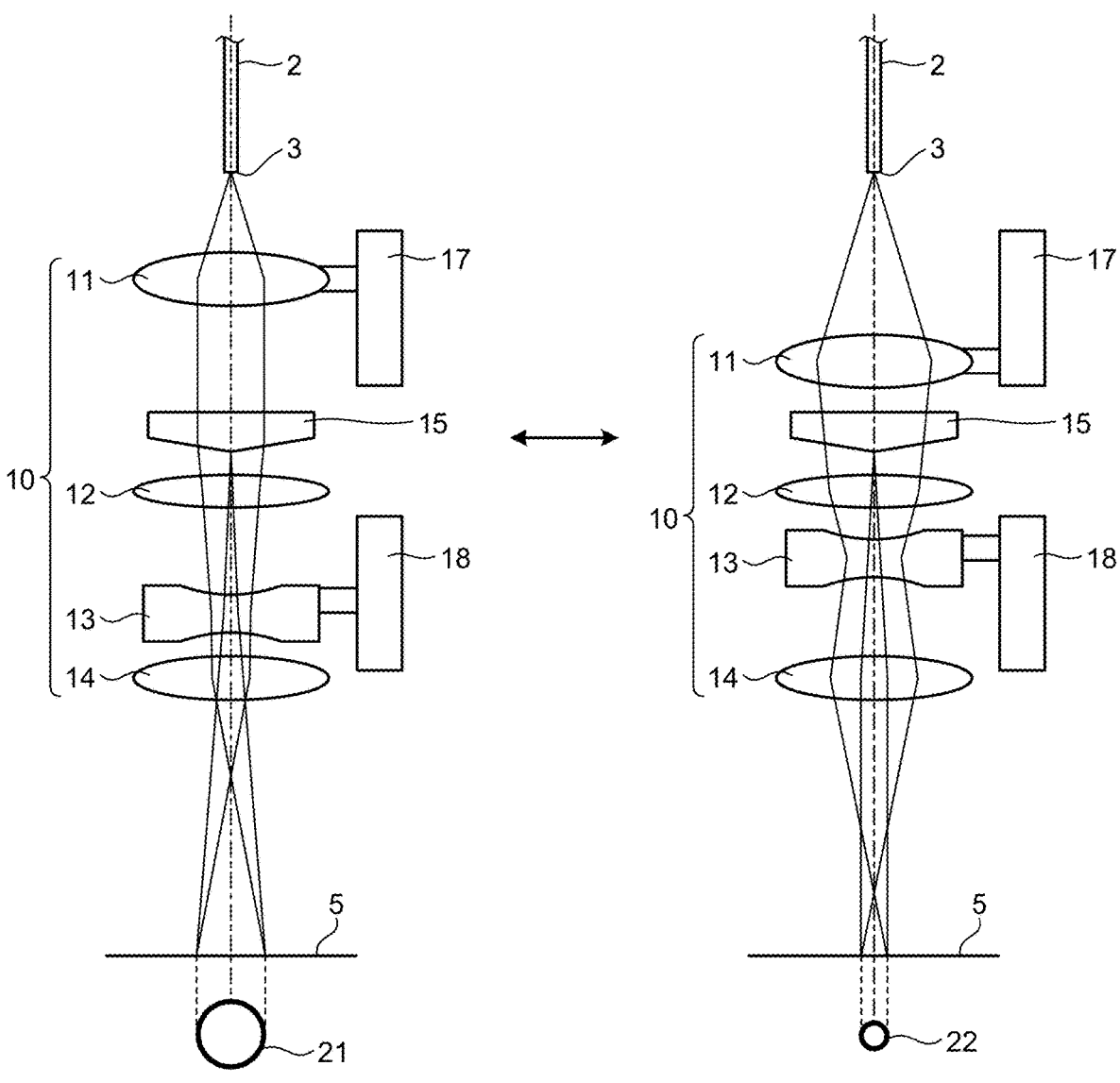
FIG. 2 is a diagram for explaining an operation of the laser machining head according to the first embodiment.

FIG. 2 is a diagram for explaining an operation of the laser machining head 1A according to the first embodiment. FIG. 2 illustrates a state in which each of the first lens group 11 and the third lens group 13 is moved in the optical axis direction. In FIG. 2, a main configuration of the laser machining head 1A is illustrated, and illustration of other configurations of the laser machining head 1A is omitted.

Here, a state illustrated in a left part of FIG. 2 is referred to as a first state. In addition, a state illustrated in a right part of FIG. 2 is referred to as a second state. In the first state, the first lens group 11 is moved toward the light emitter 3, and the third lens group 13 is moved toward the fourth lens group 14. That is, the first state is a state in which the first lens group 11 and the third lens group 13 have moved in directions away from each other. Whereas, in the second state, the first lens group 11 is moved toward the second lens group 12, and the third lens group 13 is moved toward the second lens group 12. That is, the second state is a state in which the first lens group 11 and the third lens group 13 have moved in directions of approaching each other. The state of the laser machining head 1A is switched between the first state and the second state through movement of the first lens group 11 caused by the first mover 17 and movement of the third lens group 13 caused by the second mover 18. A double-headed arrow illustrated in FIG. 2 indicates that the state of the laser machining head 1A can be switched between the first state and the second state.

A beam mode 21 is a beam mode when the laser machining head 1A is in the first state. A beam mode 22 is a beam mode when the laser machining head 1A is in the second state. Each of the beam modes 21 and 22 is a ring-shaped beam mode. A beam diameter in the beam mode 21 is larger than a beam diameter in the beam mode 22. Note that, in the following description, the beam diameter of the ring-shaped laser beam is referred to as a ring diameter.

When the laser machining head 1A is in the second state, by moving the first lens group 11 and the third lens group 13 in directions away from each other in a state where image formation of an image of the light emitter 3 at the transfer position is maintained, the state of the laser machining head 1A is switched to the first state. As a result, the laser machining head 1A enlarges the ring diameter from the beam mode 22 to the beam mode 21.

When the laser machining head 1A is in the first state, by moving the first lens group 11 and the third lens group 13 in directions of approaching each other in a state where image formation of an image of the light emitter 3 at the transfer position is maintained, the state of the laser machining head 1A is switched to the second state. As a result, the laser machining head 1A reduces the ring diameter from the beam mode 21 to the beam mode 22. In this manner, the laser machining head 1A converts the beam mode of the laser beam while maintaining image formation of the image of the light emitter 3 at the transfer position.

The state of the laser machining head 1A can be switched between the first state and the second state in accordance with a material of the workpiece 5 or a thickness of the workpiece 5. For example, in laser machining of a medium-thickness plate having a thickness of about 20 mm, machining with high quality and high efficiency can be performed by bringing the laser machining head 1A into the first state. Since the laser machining head 1A can convert the beam mode while maintaining image formation of an image of the light emitter 3 at the transfer position, it is possible to perform high-quality machining as compared with a case where it is necessary to largely shift a position of a workpiece from the transfer position. The laser machining head 1A can easily select a beam diameter suitable for a machining target through movement of the first lens group 11 and movement of the third lens group 13. By appropriately selecting a beam diameter in accordance with a material of the workpiece 5 or a thickness of the workpiece 5, it is possible to improve machining quality and productivity.

Next, a function effect of a configuration of the laser machining head 1A according to the first embodiment will be described. Here, a configuration according to a comparative example is illustrated, and a function effect obtained by the configuration of the laser machining head 1A will be described by comparison with the case of the comparative example.

Figure 3:
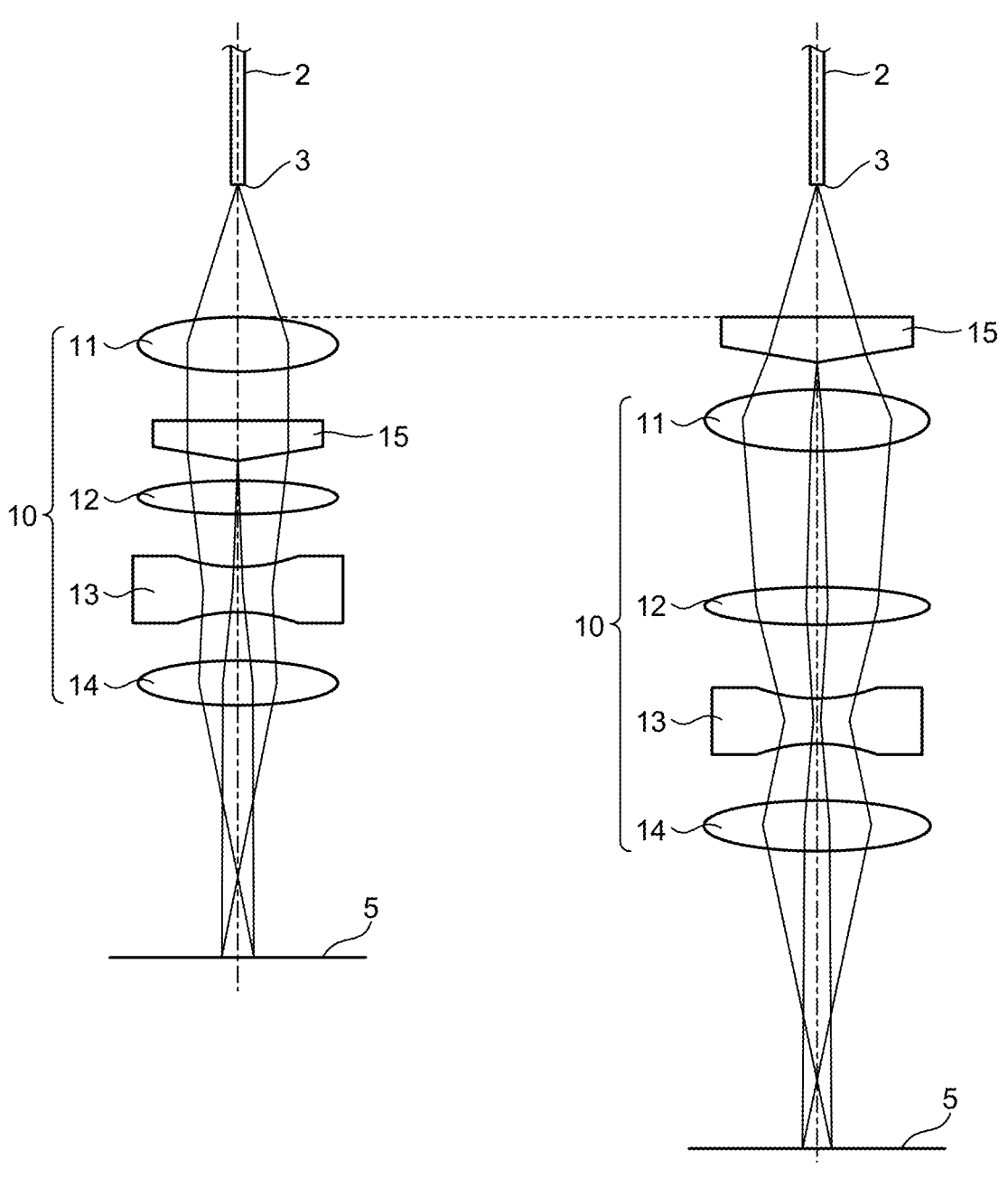
FIG. 3 is a diagram illustrating a configuration of the laser machining head according to the first embodiment and a configuration according to a first comparative example of the first embodiment.

FIG. 3 is a diagram illustrating a configuration of the laser machining head 1A according to the first embodiment and a configuration according to a first comparative example of the first embodiment. A left part of FIG. 3 illustrates a configuration included in the laser machining head 1A according to the first embodiment. A right part of FIG. 3 illustrates a configuration according to the first comparative example. The configuration according to the first comparative example is different from the configuration of the first embodiment in that the light flux conversion optical element 15 is disposed between the light emitter 3 and the first lens group 11.

Also in the configuration according to the first comparative example, the ring diameter can be changed by moving the first lens group 11 and the third lens group 13. In changing the ring diameter, the ring diameter can be made longer as a distance between the light emitter 3 and the light flux conversion optical element 15 is longer. In the case of the first comparative example, since the light flux conversion optical element 15 is disposed immediately after the light emitter 3, a distance between the light emitter 3 and the first lens group 11 becomes longer as the distance between the light emitter 3 and the light flux conversion optical element 15 is longer. As the distance between the light emitter 3 and the first lens group 11 becomes longer, it is necessary to increase a size of the optical system after the first lens group 11 in order to capture laser light diverged from the light emitter 3.

Whereas, in the laser machining head 1A according to the first embodiment, the light flux conversion optical element 15 is disposed between the first lens group 11 and the second lens group 12. Therefore, as compared with the case of the first comparative example, it is easy to secure a long distance between the light emitter 3 and the light flux conversion optical element 15. The laser machining head 1A is configured such that the light flux conversion optical element 15 is disposed between the first lens group 11 and the second lens group 12, and each of the first lens group 11 and the third lens group 13 is moved, so that a degree of changing the ring diameter can be increased without increasing the size of the optical system after the first lens group 11. In FIG. 3, the distance between the light emitter 3 and the first lens group 11 in the first embodiment is equal to the distance between the light emitter 3 and the light flux conversion optical element 15 in the first comparative example, but the optical system after the first lens group 11 is smaller in the case of the first embodiment than in the first comparative example.

Furthermore, in the first comparative example, instead of securing a long distance between the light emitter 3 and the light flux conversion optical element 15, the ring diameter can be increased by reducing an apex angle of the conical shape in the light flux conversion optical element 15. However, as the apex angle of the conical shape in the light flux conversion optical element 15 is reduced, highly accurate alignment of the light flux conversion optical element 15 is required. The laser machining head 1A according to the first embodiment can increase the ring diameter without reducing the apex angle of the conical shape in the light flux conversion optical element 15.

As a position of the light flux conversion optical element 15 is closer to the light emitter 3, intensity of the laser light entering the light flux conversion optical element 15 increases. As the intensity of the laser light entering the light flux conversion optical element 15 increases, possibility that the light flux conversion optical element 15 is damaged by heat increases. In the case of the first comparative example, since the light flux conversion optical element 15 is disposed immediately after the light emitter 3, the position of the light flux conversion optical element 15 tends to be close to the light emitter 3. Whereas, in the laser machining head 1A according to the first embodiment, the light flux conversion optical element 15 is disposed between the first lens group 11 and the second lens group 12. Therefore, as compared with the case of the first comparative example, the light flux conversion optical element 15 can be separated from the light emitter 3. The laser machining head 1A can prevent an increase of intensity of the laser light entering the light flux conversion optical element 15, and can reduce possibility of damaging the light flux conversion optical element 15.

Figure 4:
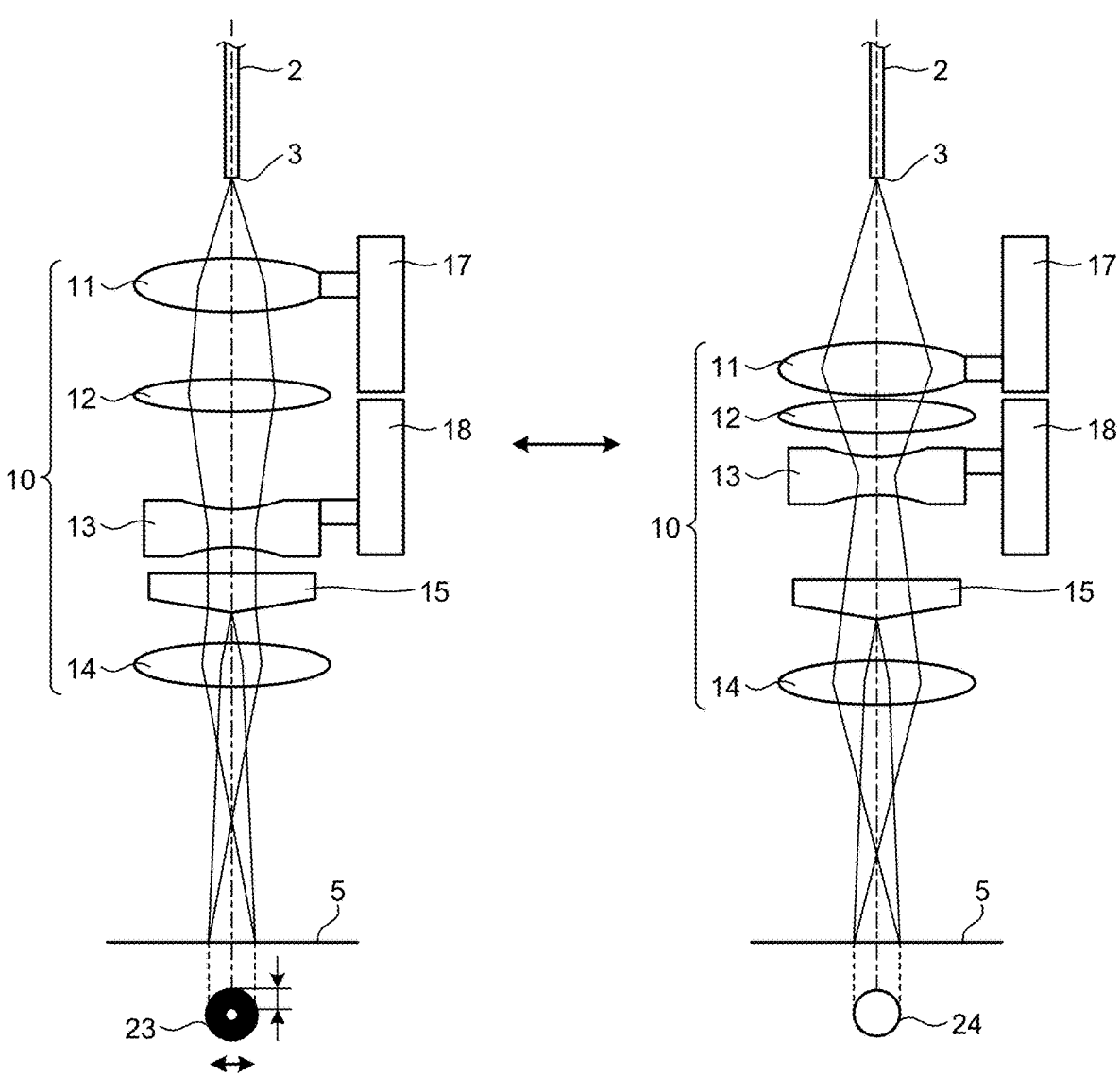
FIG. 4 is a diagram illustrating a configuration according to a second comparative example of the first embodiment.

FIG. 4 is a diagram illustrating a configuration according to a second comparative example of the first embodiment. The configuration according to the second comparative example is different from the configuration of the first embodiment in that the light flux conversion optical element 15 is disposed between the third lens group 13 and the fourth lens group 14. A left part of FIG. 4 illustrates a state in which the first lens group 11 is moved toward the light emitter 3 and the third lens group 13 is moved toward the light flux conversion optical element 15. A right part of FIG. 4 illustrates a state in which the first lens group 11 is moved toward the second lens group 12 and the third lens group 13 is moved toward the second lens group 12. A double-headed arrow illustrated in FIG. 4 indicates that the configuration according to the second comparative example can switch the state between the state illustrated in the left part of FIG. 4 and the state illustrated in the right part of FIG. 4.

In the case of the second comparative example, a thickness of the ring mainly changes in the ring-shaped beam mode by moving the first lens group 11 and the third lens group 13. A ring width is large in a beam mode 23 in the state illustrated in the left part of FIG. 4, and the ring width is small in a beam mode 24 in the state illustrated in the right part of FIG. 4. In the case of the second comparative example, a change in thickness of the ring is large while a change in ring diameter is small.

The laser machining head 1A according to the first embodiment can greatly change the ring diameter without greatly increasing the thickness of the ring. The laser machining head 1A can increase an energy density in an outer edge portion as compared with the case where the thickness of the ring greatly increases. As a result, the laser machining head 1A can perform high-quality and efficient machining according to a material of the workpiece 5 or a thickness of the workpiece 5.

As described above, a form of change of the beam mode by moving the first lens group 11 and the third lens group 13 differs depending on a position where the light flux conversion optical element 15 is disposed. In the laser machining head 1A, by disposing the light flux conversion optical element 15 on the optical axis between the first lens group 11 and the second lens group 12, it is possible to achieve high-quality machining and highly efficient machining on the workpieces 5 of various materials or various thicknesses.

Figure 5:
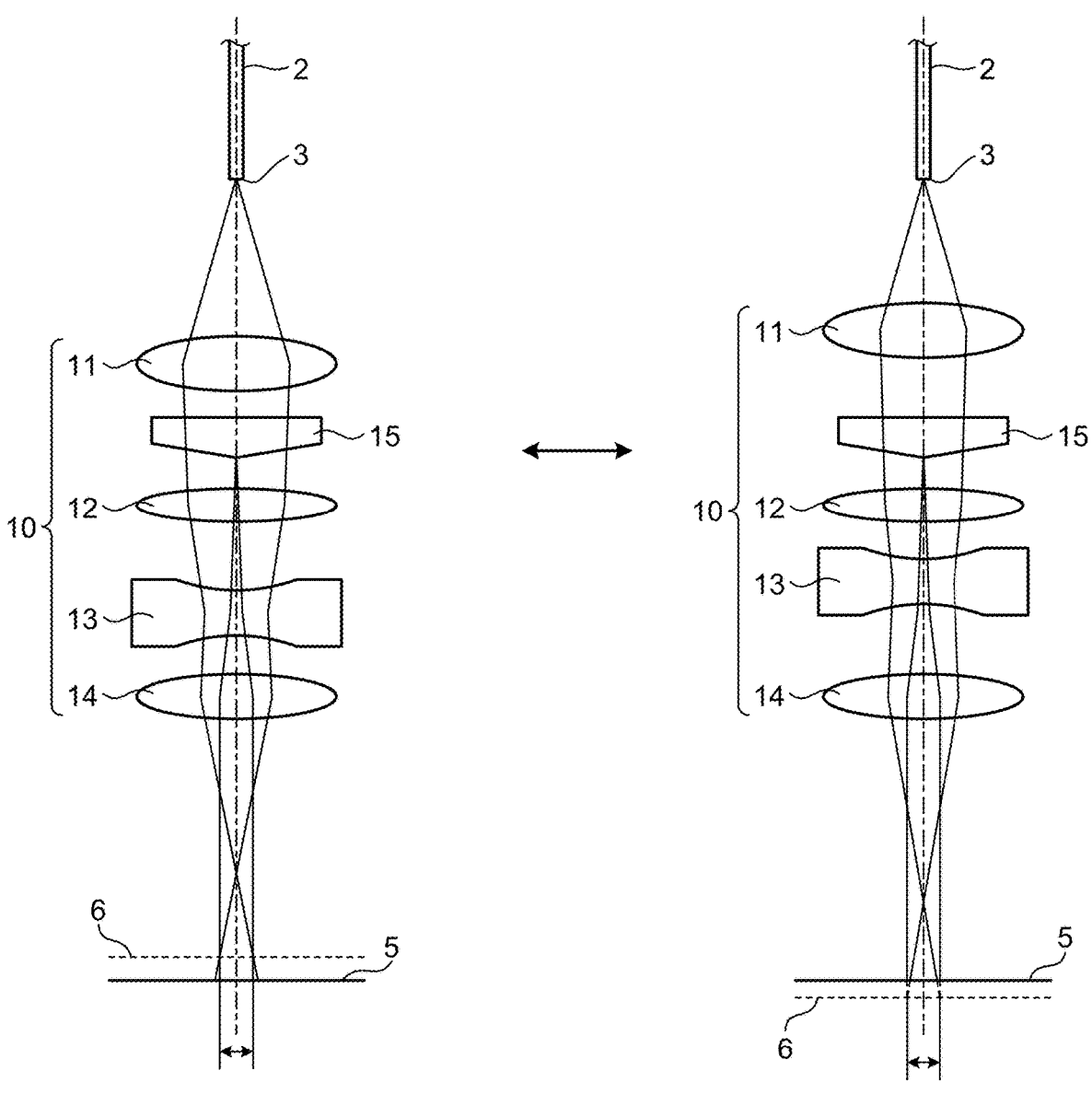
FIG. 5 is a diagram illustrating an example in which a distance from a light emitter to a transfer position is changed by the laser machining head according to the first embodiment.

Furthermore, the laser machining head 1A can change the distance from the light emitter 3 to the transfer position while maintaining a transfer magnification, by moving the first lens group 11 and the third lens group 13. FIG. 5 is a diagram illustrating an example in which a distance from the light emitter 3 to the transfer position is changed by the laser machining head 1A according to the first embodiment.

A left part of FIG. 5 illustrates a state in which a transfer position 6 is set on the laser machining head 1A side with respect to a position on the workpiece 5. A right part of FIG. 5 illustrates a state in which the transfer position 6 is set on a side opposite to the laser machining head 1A with respect to a position on the workpiece 5. A double-headed arrow illustrated in FIG. 5 indicates that the laser machining head 1A can switch between the state illustrated in the left part of FIG. 5 and the state illustrated in the right part of FIG. 5. The laser machining head 1A can change the transfer position 6 in the optical axis direction by appropriately adjusting a position of the first lens group 11 and a position of the third lens group 13. As a result, the laser machining head 1A can achieve high-quality machining and highly efficient machining on the workpieces 5 of various materials or various thicknesses.

Since the number of the light flux conversion optical elements 15 required for the laser machining head 1A is one, the laser machining head 1A can reduce a cost of the optical system as compared with a case where two axicon lenses are required as described in Patent Literature 1. In addition, when the two axicon lenses are moved as described in Patent Literature 1, there is a concern about damage to each axicon lens due to contact between the axicon lenses. The laser machining head 1A can solve such a concern.

Note that, in the above description, the laser machining head 1A includes the mover that moves the first lens group 11 and the mover that moves the third lens group 13. The laser machining head 1A may include a mover that moves an optical component other than the first lens group 11 or the third lens group 13. For example, a mover for moving the second lens group 12 or the fourth lens group 14 may be added to the laser machining head 1A. As a result, the laser machining head 1A can appropriately perform adjustment for improving machining quality or adjustment for improving productivity.

In the above description, the light flux conversion optical element 15 is an axicon lens, but the light flux conversion optical element 15 may be an optical element other than the axicon lens. The light flux conversion optical element 15 may be an optical element having a shape other than a conical shape, such as a polyhedral shape or an aspherical shape. The light flux conversion optical element 15 may be an array-type optical element in which many shapes such as a conical shape, a polyhedral shape, and an aspherical shape are disposed. The light flux conversion optical element 15 is not limited to a refractive optical element, and may be a diffractive optical element.

According to the first embodiment, the laser machining head 1A includes: the first lens group 11; the second lens group 12; the third lens group 13; the fourth lens group 14; and the light flux conversion optical element 15 disposed on the optical axis between the first lens group 11 and the second lens group 12. Further, the laser machining head 1A includes the first mover 17 that moves the first lens group 11 and the second mover 18 that moves the third lens group 13. The laser machining head 1A can easily convert a beam mode of a laser beam through movement of the first lens group 11 and the movement of the third lens group 13. The laser machining head 1A can improve machining quality and productivity by selecting the beam mode in accordance with a material of the workpiece 5 or a thickness of the workpiece 5. As described above, the laser machining head 1A exhibits an effect of achieving high-quality machining by beam mode conversion. Further, the laser machining head 1A can improve productivity.

Second Embodiment

Figure 6:
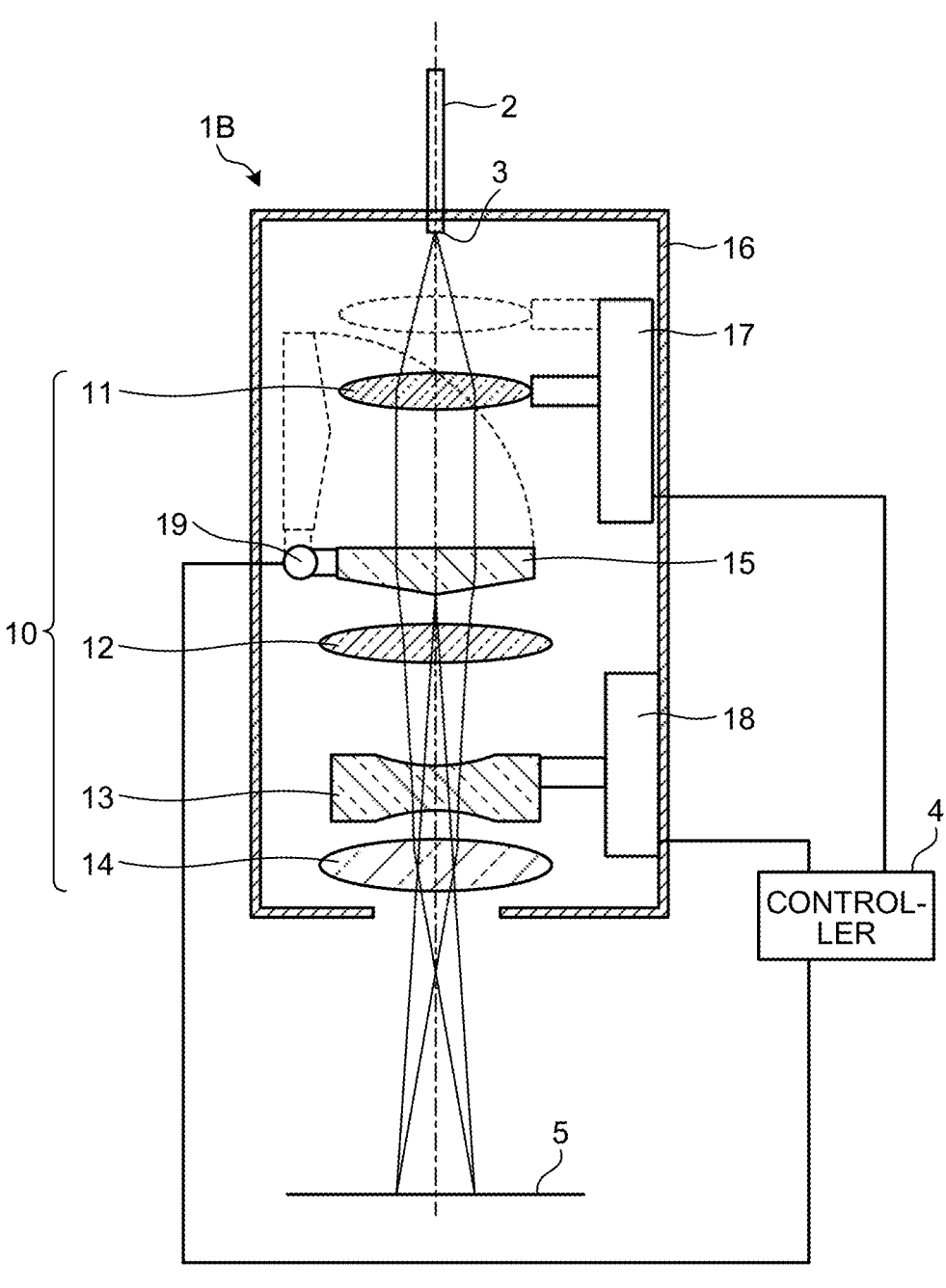
FIG. 6 is a diagram illustrating an exemplary configuration of a laser machining head according to a second embodiment.

FIG. 6 is a diagram illustrating an exemplary configuration of a laser machining head 1B according to a second embodiment. The laser machining head 1B includes a third mover 19 in addition to configurations similar to the laser machining head 1A according to the first embodiment. In the second embodiment, components identical to those in the first embodiment described above are denoted by identical reference numerals, and configurations different from those in the first embodiment will be mainly described.

The third mover 19 moves the light flux conversion optical element 15 to a position on an optical axis between the first lens group 11 and the second lens group 12 and a position off the optical axis. In the example illustrated in FIG. 6, the third mover 19 moves the light flux conversion optical element 15 by rotating the light flux conversion optical element 15 about an axis perpendicular to the optical axis. The light flux conversion optical element 15 is attached to a rotatable holder in conjunction with the third mover 19. The light flux conversion optical element 15 moves together with the holder by the rotation of the third mover 19. Illustration of the holder is omitted.

The controller 4 transmits a control signal to each of the first mover 17, the second mover 18, and the third mover 19. The third mover 19 moves the light flux conversion optical element 15 in response to the control signal. The controller 4 controls the first mover 17, the second mover 18, and the third mover 19 by sending a control signal to each of the first mover 17, the second mover 18, and the third mover 19.

In FIG. 6, a solid line indicates the light flux conversion optical element 15 when the light flux conversion optical element 15 is disposed at a position on the optical axis. In FIG. 6, a broken line indicates the light flux conversion optical element 15 and a part of the third mover 19 when the light flux conversion optical element 15 is off the optical axis. Further, in FIG. 6, a broken line indicates a trajectory along which the light flux conversion optical element 15 moves. The first mover 17 moves the first lens group 11 when the third mover 19 moves the light flux conversion optical element 15. By moving the first lens group 11 before the movement of the light flux conversion optical element 15, the laser machining head 1B can avoid the first lens group 11 from hindering the movement of the light flux conversion optical element 15. In FIG. 6, a broken line indicates the first lens group 11 and a part of the first mover 17 when the first lens group 11 is moved before the movement of the light flux conversion optical element 15.

Next, an operation of the laser machining head 1B when converting a beam mode of a laser beam emitted from the laser machining head 1B will be described.

Figure 7:
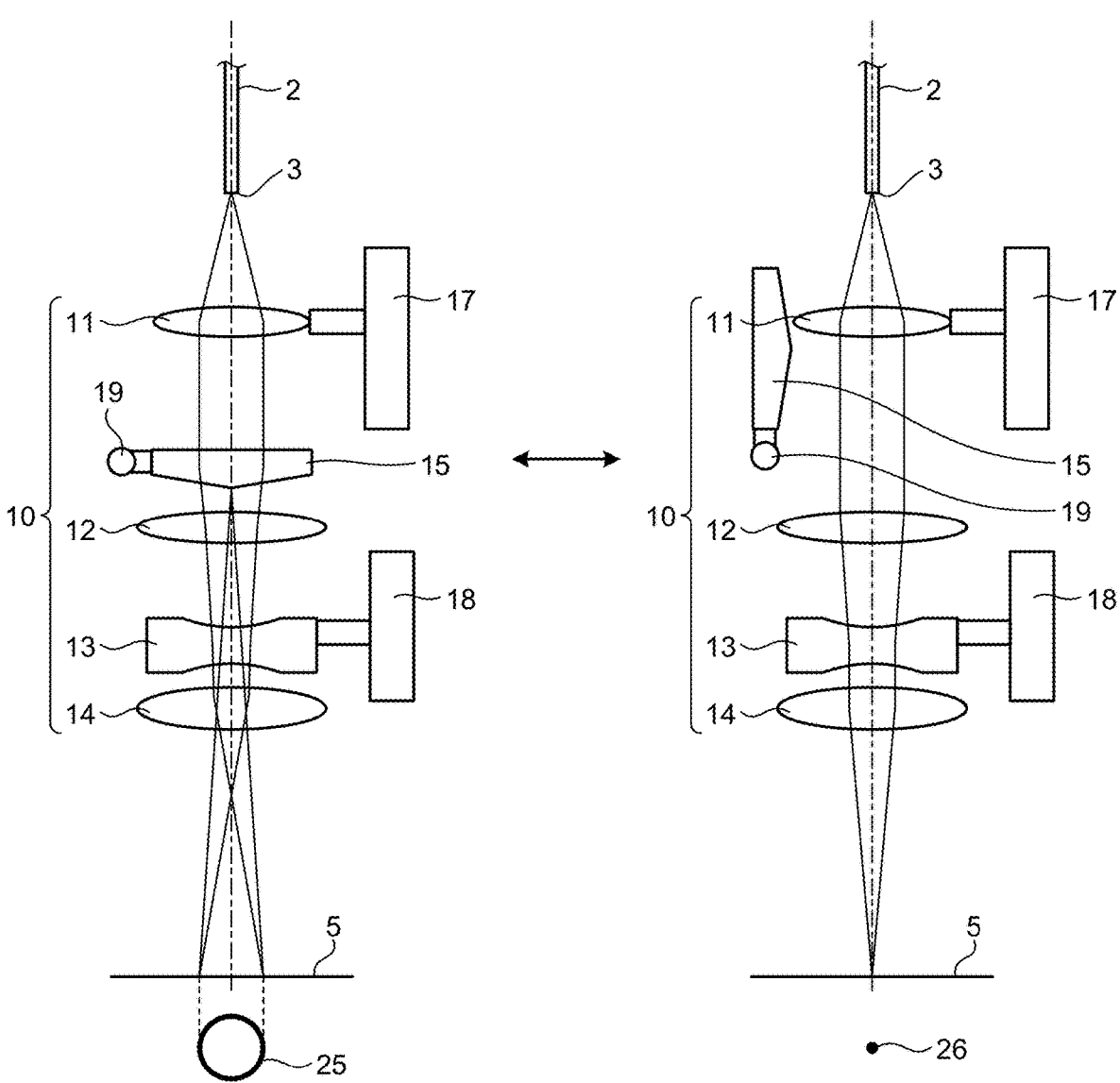
FIG. 7 is a first diagram for explaining an operation of the laser machining head according to the second embodiment.

FIG. 7 is a first diagram for explaining an operation of the laser machining head 1B according to the second embodiment. FIG. 7 illustrates a state in which the light flux conversion optical element 15 is disposed on the optical axis and a state in which the light flux conversion optical element 15 is at a position off the optical axis. In FIG. 7, a main configuration of the laser machining head 1B is illustrated, and illustration of other configurations of the laser machining head 1B is omitted.

Here, a state illustrated in a left part of FIG. 7 is referred to as a third state. Furthermore, a state illustrated in a right part of FIG. 7 is referred to as a fourth state. In the third state, the light flux conversion optical element 15 is disposed on the optical axis. A positional relationship among the first lens group 11, the third lens group 13, and the light flux conversion optical element 15 in the third state is identical to that in the first state illustrated in the left part of FIG. 2. A beam mode 25 in the third state is similar to the beam mode 21 illustrated in FIG. 2. In the third state, by appropriately moving the first lens group 11 and the third lens group 13, the laser machining head 1B changes a ring diameter similarly to the case of the first embodiment.

From the third state, the first lens group 11 is moved toward the light emitter 3 by the first mover 17, and then the third mover 19 moves the light flux conversion optical element 15 from the optical axis. That is, the third mover 19 retracts the light flux conversion optical element 15 from the optical axis. In the example illustrated in FIG. 7, the light flux conversion optical element 15 is retracted from the optical axis, and then the first mover 17 returns the first lens group 11 to the original position. As a result, the laser machining head 1B transitions from the third state to the fourth state. As described above, the state of the laser machining head 1B is switched between the third state and the fourth state through movement of the light flux conversion optical element 15 by the third mover 19. Further, when the light flux conversion optical element 15 is to be moved by the third mover 19, the laser machining head 1B moves the first lens group 11 by using the first mover 17. A double-headed arrow illustrated in FIG. 7 indicates that the state of the laser machining head 1B can be switched between the third state and the fourth state.

In the fourth state, an image of the light emitter 3 is transferred by the transfer optical system 10. In a case where the transmission cable 2 is an optical fiber, the transfer image of the light emitter 3 is circular. In this case, in the fourth state, a circular beam mode 26 is obtained. The laser machining head 1B can convert the beam mode by inserting the light flux conversion optical element 15 into the optical axis and retracting the light flux conversion optical element 15 from the optical axis.

In addition, the laser machining head 1B can change the beam diameter by appropriately moving the first lens group 11 and the third lens group 13 in the fourth state.

Figure 8:
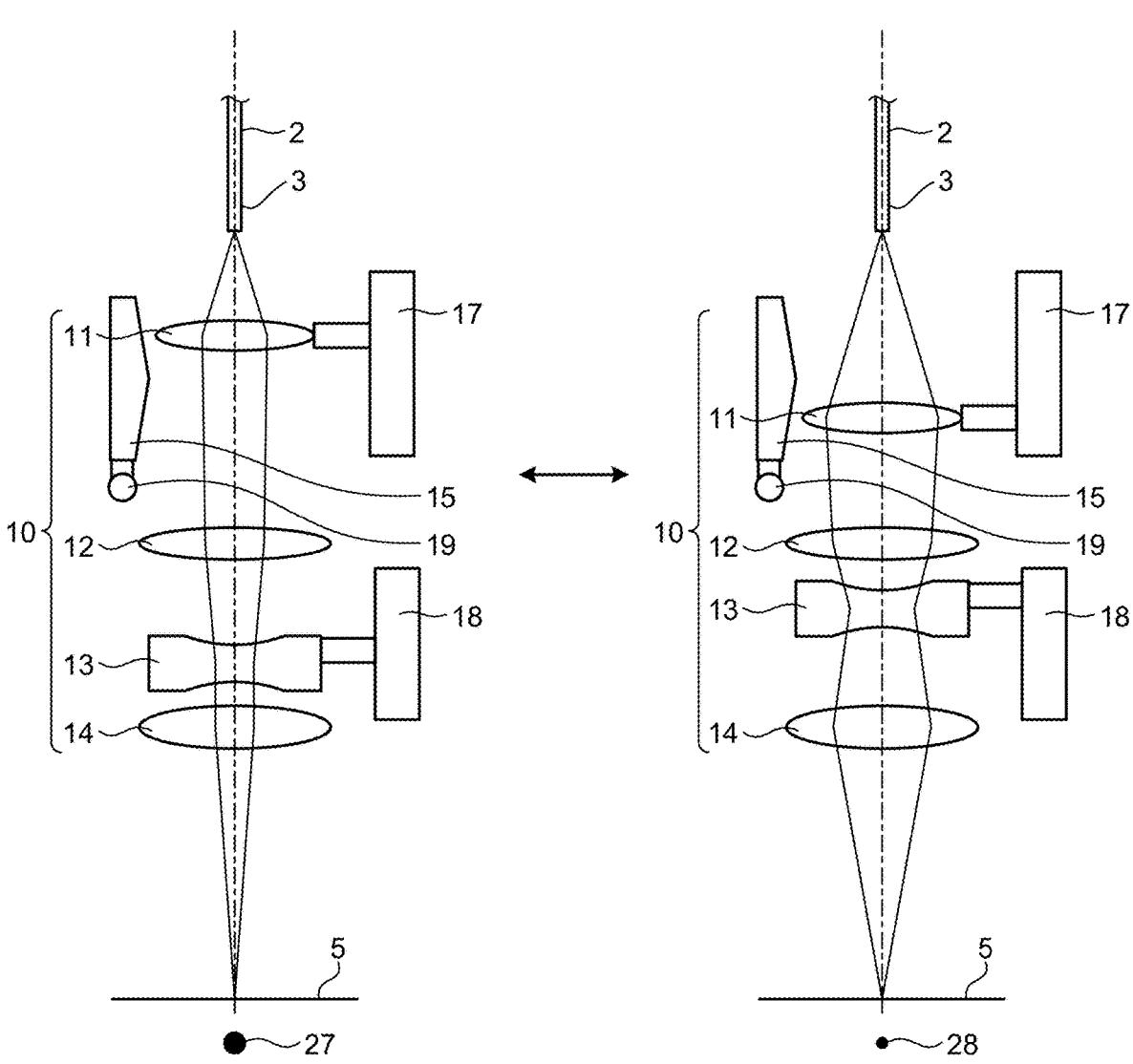
FIG. 8 is a second diagram for explaining an operation of the laser machining head according to the second embodiment.

FIG. 8 is a second diagram for explaining an operation of the laser machining head 1B according to the second embodiment. FIG. 8 illustrates a state in which each of the first lens group 11 and the third lens group 13 is moved in the optical axis direction in the fourth state. In FIG. 8, a main configuration of the laser machining head 1B is illustrated, and illustration of other configurations of the laser machining head 1B is omitted.

In a state illustrated in a left part of FIG. 8, the first lens group 11 is moved toward the light emitter 3, and the third lens group 13 is moved toward the fourth lens group 14. That is, the state illustrated in the left part of FIG. 8 is a state in which the first lens group 11 and the third lens group 13 have moved in directions away from each other. Whereas, in a state illustrated in a right part of FIG. 8, the first lens group 11 is moved toward the second lens group 12, and the third lens group 13 is moved toward the second lens group 12. That is, the state illustrated in the right part of FIG. 8 is a state in which the first lens group 11 and the third lens group 13 have moved in directions of approaching each other. A double-headed arrow illustrated in FIG. 8 indicates that the laser machining head 1B can switch between the state illustrated in the left part of FIG. 8 and the state illustrated in the right part of FIG. 8. The laser machining head 1B changes a transfer magnification of the transfer optical system 10 by moving the first lens group 11 and the third lens group 13.

A beam diameter in a beam mode 28 in the state illustrated in the right part of FIG. 8 is smaller than a beam diameter in a beam mode 27 in the state illustrated in the left part of FIG. 8. By moving the first lens group 11 and the third lens group 13 in directions of approaching each other, the beam diameter decreases. In addition, the beam diameter increases by moving the first lens group 11 and the third lens group 13 in directions away from each other. In this manner, the laser machining head 1B converts the beam diameter of the laser beam.

The laser machining head 1B switches a shape of the beam mode between a ring shape and a circular shape through movement of the light flux conversion optical element 15. The laser machining head 1B changes a ring diameter of the ring-shaped beam mode by moving the first lens group 11 and the third lens group 13 in the third state in which the light flux conversion optical element 15 is disposed on the optical axis. The laser machining head 1B changes a beam diameter in the circular beam mode by moving the first lens group 11 and the third lens group 13 in the fourth state in which the light flux conversion optical element 15 is retracted to the outside of the optical axis.

By the movement of the first lens group 11, the movement of the third lens group 13, and the movement of the light flux conversion optical element 15, the laser machining head 1B can easily select a ring diameter or a beam diameter suitable for a machining target and a beam mode suitable for the machining target. By appropriately selecting the ring diameter or the beam diameter and the beam mode in accordance with a material of the workpiece 5 or a thickness of the workpiece 5, it is possible to improve machining quality and improve productivity.

The laser machining head 1B creates a space for moving the light flux conversion optical element 15 by moving the first lens group 11 when the third mover 19 moves the light flux conversion optical element 15. Therefore, the laser machining head 1B does not need to always secure the space for moving the light flux conversion optical element 15 in the optical system, and the optical system can be downsized. The laser machining head 1B also uses the first mover 17 which used for conversion of the ring diameter, as a mover for creating the space. For the laser machining head 1B, it is not necessary to provide a mover for creating the space separately from the first mover 17 which is used for conversion of the ring diameter. When moving the light flux conversion optical element 15 by rotating the light flux conversion optical element 15 about an axis perpendicular to the optical axis, the space through which the light flux conversion optical element 15 passes is required on the optical axis, so that the effect of the configuration in which the first lens group 11 is moved by the first mover 17 is large.

Figure 12:
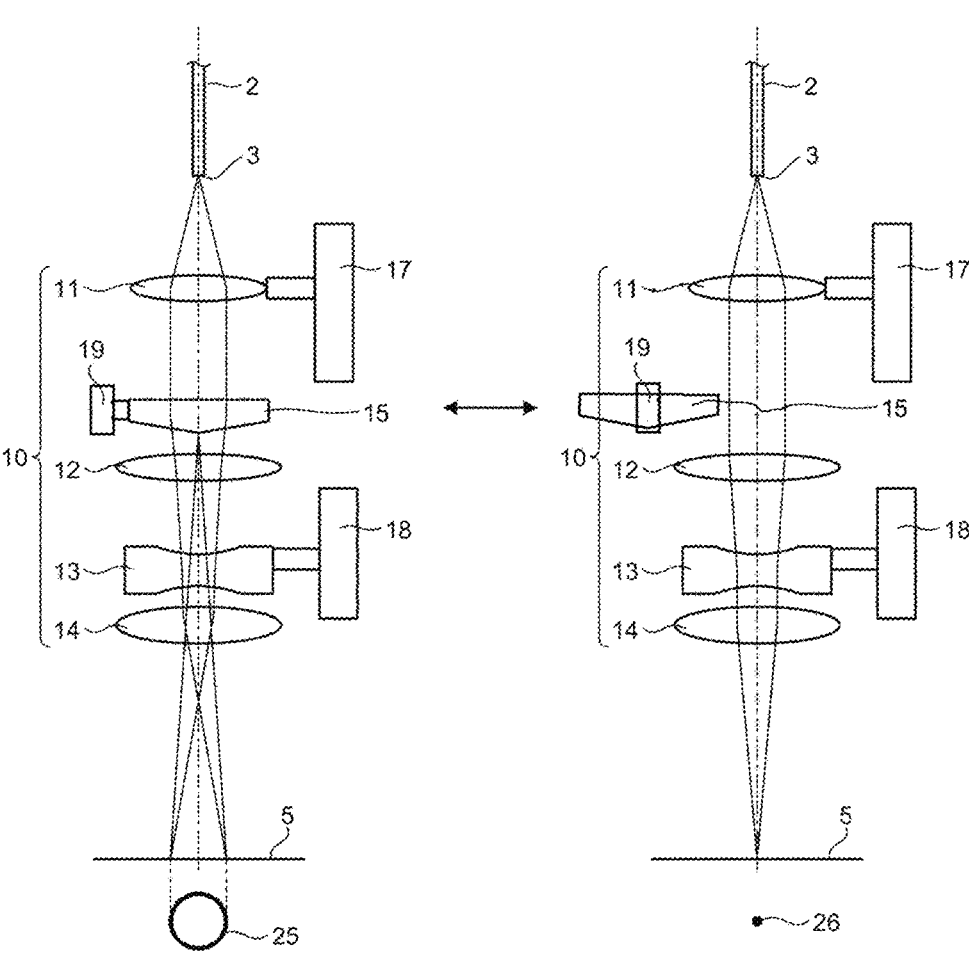
FIG. 12 is a diagram for explaining an operation of the laser machining head according to another embodiment.

With a simple configuration of rotating the light flux conversion optical element 15 about an axis perpendicular to the optical axis, the laser machining head 1B can move the light flux conversion optical element 15 to a position on the optical axis between the first lens group 11 and the second lens group 12 and a position off the optical axis. Note that the third mover 19 is not limited to the mechanism that rotates the light flux conversion optical element 15 about an axis perpendicular to the optical axis. The third mover 19 may be a mechanism that rotates the light flux conversion optical element 15 about an axis parallel to the optical axis (see, e.g., FIG. 12). Alternatively, the third mover 19 may be a mechanism that moves the light flux conversion optical element 15 in a plane perpendicular to the optical axis. The third mover 19 is only required to be a mechanism that moves the light flux conversion optical element 15 to a position on the optical axis between the first lens group 11 and the second lens group 12 and a position off the optical axis. When the light flux conversion optical element 15 is rotated about an axis perpendicular to the optical axis, the housing 16 can be downsized as compared with a case where the light flux conversion optical element 15 is rotated about an axis parallel to the optical axis or a case where the light flux conversion optical element 15 is moved in a plane perpendicular to the optical axis.

The laser machining head 1B is configured to move the light flux conversion optical element 15, so that presence or absence of an action of the light flux conversion optical element 15 is switched using one optical system included in the laser machining head 1B. By switching the presence or absence of the action of the light flux conversion optical element 15, the laser machining head 1B can switch between the ring-shaped beam mode and a beam mode that is a transfer image of the light emitter 3. Furthermore, the laser machining head 1B can perform beam mode conversion of changing a ring diameter and beam mode conversion of changing a magnification of a transfer image, through movement of the first lens group 11 and movement of the third lens group 13.

According to the second embodiment, the laser machining head 1B moves the light flux conversion optical element 15 to a position on the optical axis between the first lens group 11 and the second lens group 12 and a position off the optical axis, by using the third mover 19. The laser machining head 1B can easily convert the beam mode of the laser beam by moving the light flux conversion optical element 15. Further, the laser machining head 1B can easily convert a beam mode of a laser beam through movement of the first lens group 11 and the movement of the third lens group 13. The laser machining head 1B can improve machining quality and productivity by selecting the beam mode in accordance with a material of the workpiece 5 or a thickness of the workpiece 5. As described above, the laser machining head 1B exhibits an effect of achieving high-quality machining by beam mode conversion. Further, the laser machining head 1B can improve productivity.

Third Embodiment

Figure 9:
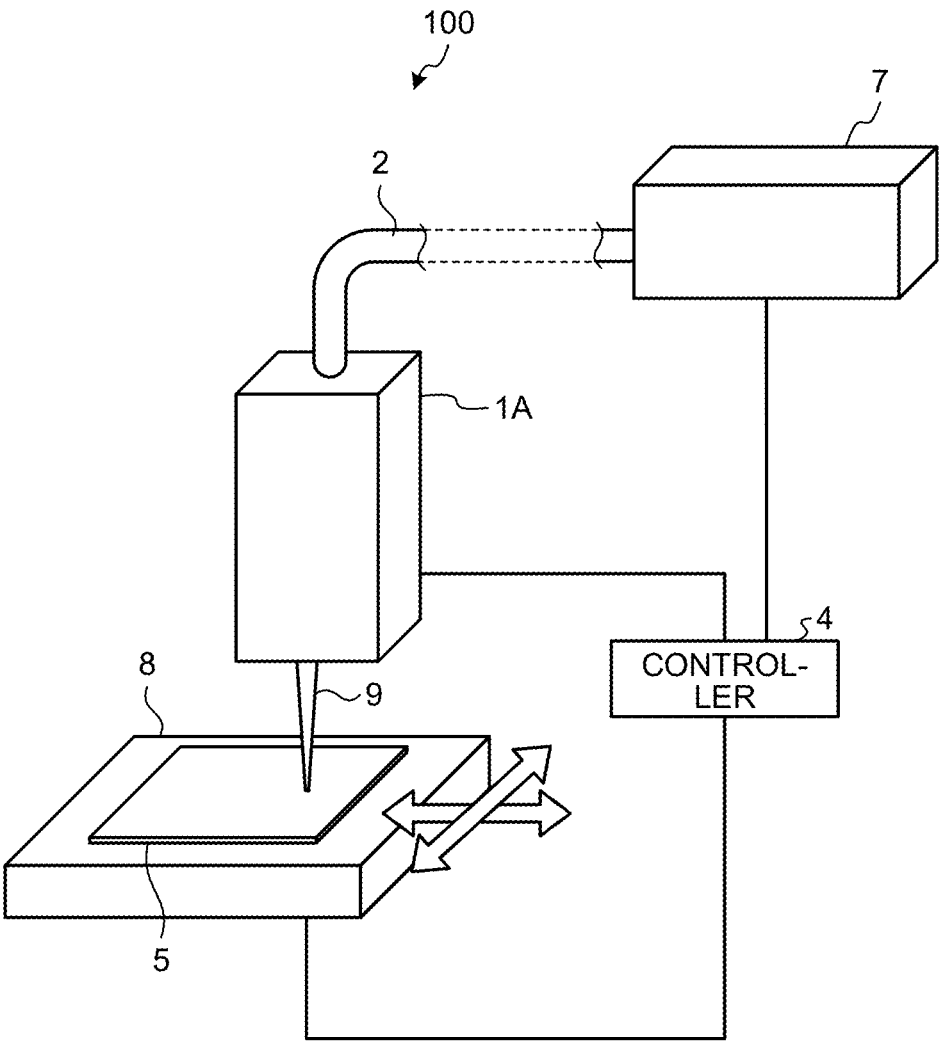
FIG. 9 is a diagram illustrating an exemplary configuration of a laser machine according to a third embodiment.

In a third embodiment, a laser machine including the laser machining head 1A or the laser machining head 1B will be described. FIG. 9 is a diagram illustrating an exemplary configuration of a laser machine 100 according to the third embodiment. The laser machine 100 illustrated in FIG. 9 includes the laser machining head 1A according to the first embodiment. The laser machine 100 may include the laser machining head 1B according to the second embodiment instead of the laser machining head 1A. In the third embodiment, components identical to those in the first or second embodiment described above are denoted by identical reference numerals, and configurations different from those in the first or second embodiment will be mainly described.

The laser machine 00 includes: a laser oscillator 7 as a light source that outputs laser light; the laser machining head 1A; the transmission cable 2 as a transmission path of the laser light from the laser oscillator 7 to the laser machining head 1A; a stage 8 on which the workpiece 5 is placed; and the controller 4 which controls the laser machine 100. The laser machine 100 is configured to machine the workpiece 5 by irradiating the workpiece 5 with a laser beam 9 emitted from the laser machining head 1A. The laser machining head 1A injects machining gas to the workpiece 5. An element for injecting the machining gas is not illustrated.

The laser machine 100 relatively moves the laser beam 9 and the workpiece 5 by moving the stage 8 with respect to the laser machining head 1A. The stage 8 is movable in a two-dimensional direction perpendicular to a central axis of the laser beam 9. In FIG. 9, white double-headed arrows indicate directions in which the stage 8 can be moved. Note that the laser machine 100 may relatively move the laser beam 9 and the workpiece 5 without moving the stage 8. The laser machine 100 may fix a position of the stage 8 and control an entering position of the laser beam 9 on the workpiece 5.

The controller 4 transmits a control signal to each of the laser machining head 1A, the laser oscillator 7, and the stage 8. The laser oscillator 7 outputs the laser light in response to the control signal. As described in the first embodiment, the laser machining head 1A moves the first lens group 11 and the third lens group 13 in response to the control signal. The stage 8 operates in response to the control signal. In this manner, the controller 4 controls each of the laser machining head 1A, the laser oscillator 7, and the stage 8.

According to the third embodiment, the laser machine 100 includes the laser machining head 1A or the laser machining head 1B, so that the workpiece 5 can be machined by appropriately selecting a beam mode in accordance with a material of the workpiece 5 or a thickness of the workpiece 5. The laser machine 100 can improve machining quality and productivity by selecting the beam mode. The laser machine 100 exhibits an effect of achieving high-quality machining by beam mode conversion. In addition, the laser machine 100 can improve productivity. The laser machine 100 can improve machining quality and productivity particularly for a medium-thickness plate or a plate thicker than a medium-thickness plate.

Next, a hardware configuration for implementing the controller 4 according to the first or second embodiment will be described. The controller 4 is implemented by processing circuitry. The processing circuitry may be circuitry in which a processor executes software, or may be dedicated circuitry.

Figure 10:
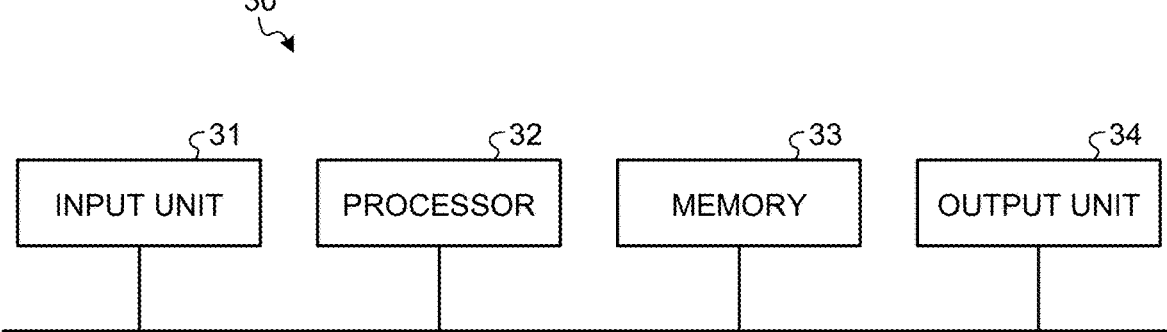
FIG. 10 is a diagram illustrating an exemplary configuration of a control circuit according to the first or second embodiment.

In a case where the processing circuitry is implemented by software, the processing circuitry is, for example, a control circuit 30 illustrated in FIG. 10. FIG. 10 is a diagram illustrating an exemplary configuration of the control circuit 30 according to the first or second embodiment. The control circuit 30 includes an input unit 31, a processor 32, a memory 33, and an output unit 34.

The input unit 31 is an interface circuit that receives data input from the outside of the control circuit 30 and gives data to the processor 32. The output unit 34 is an interface circuit that sends data from the processor 32 or the memory 33 to the outside of the control circuit 30. In a case where the processing circuitry is the control circuit 30 illustrated in FIG. 10, the functions of the controller 4 are implemented by the processor 32 reading and executing a program stored in the memory 33. The memory 33 is also used as a temporary memory in each process performed by the processor 32.

The processor 32 is a central processing unit (CPU), a processing device, an arithmetic device, a microprocessor, a microcomputer, a processor, or a digital signal processor (DSP). The memory 33 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EEPROM) (registered trademark), a magnetic disk, a flexible disk, an optical disk, a compact disk, a mini disk, a digital versatile disc (DVD), or the like.

Figure 11:
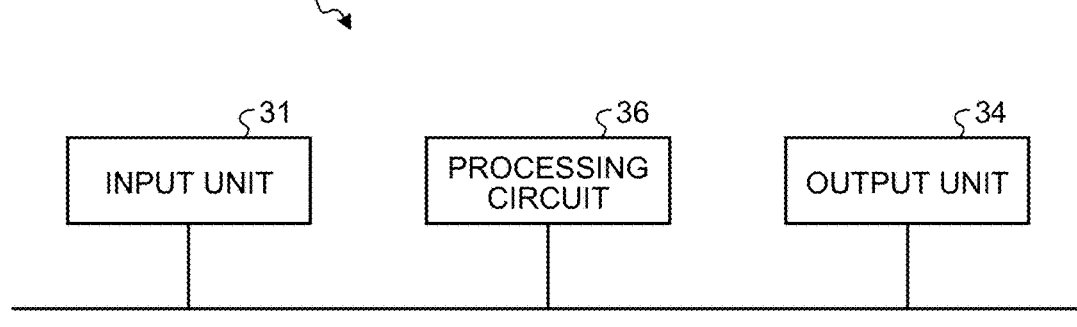
FIG. 11 is a diagram illustrating an exemplary configuration of a dedicated hardware circuit according to the first or second embodiment.

FIG. 10 is an example of hardware in a case where the controller 4 is implemented by the general-purpose processor 32 and memory 33, but the controller 4 may be implemented by a dedicated hardware circuit. FIG. 11 is a diagram illustrating an exemplary configuration of a dedicated hardware circuit 35 according to the first or second embodiment.

The dedicated hardware circuit 35 includes the input unit 31, the output unit 34, and processing circuitry 36. The processing circuitry 36 is a single circuit, a composite circuit, a programmed processor, a parallel programmed processor, an application specific integrated circuit (ASIC), a field programmable gate array (FPGA), or a circuit obtained by combining these. Note that the controller 4 may be implemented by combining the control circuit 30 and the hardware circuit 35.

The configuration described in each of the above embodiments illustrates an example of the contents of the present disclosure. The configuration of each embodiment can be combined with another known technique. The configurations of the individual embodiments may be appropriately combined. A part of the configuration of each embodiment can be omitted or changed without departing from the gist of the present disclosure.

REFERENCE SIGNS LIST

1A, 1B laser machining head; 2 transmission cable; 3 light emitter; 4 controller; 5 workpiece; 6 transfer position; 7 laser oscillator; 8 stage; 9 laser beam; 10 transfer optical system; 11 first lens group; 12 second lens group; 13 third lens group; 14 fourth lens group; 15 light flux conversion optical element; 16 housing; 17 first mover; 18 second mover; 19 third mover; 21, 22, 23, 24, 25, 26, 27, 28 beam mode; 30 control circuit; 31 input unit; 32 processor; 33 memory; 34 output unit; 35 hardware circuit; 36 processing circuitry; 100 laser machine.

The invention claimed is:

1. A laser machining head comprising:
a first lens group to which laser light diverging from a light emitter enters and configured to concentrate the laser light, wherein the first lens group is a lens group having positive power;
a second lens group to which the laser light having passed through the first lens group propagates, wherein the second lens group is a lens group having positive power;
a third lens group, wherein the laser light having passed through the second lens group propagates to the third lens group, and wherein the third lens group is a lens group having negative power;
a fourth lens group to which the laser light having passed through the third lens group enters and configured to concentrate the laser light, wherein the fourth lens group is a lens group having positive power;
a light flux conversion optical element removably disposed on an optical axis between the first lens group and the second lens group and configured to convert a beam mode of the laser light into a ring-shaped beam mode at a transfer position, the light flux conversion optical element being a single axicon lens;
a first mover configured to move the first lens group in an optical axis direction; and
a second mover configured to move the third lens group in the optical axis direction,
wherein the first lens group, the second lens group, the third lens group, and the fourth lens group constitute a transfer optical system which forms an image of the light emitter at the transfer position, and
wherein, when the light flux conversion optical element exists on the optical axis, the light flux conversion optical element is also included in the components of the transfer optical system.

2. The laser machining head according to claim 1, comprising
a third mover configured to move the light flux conversion optical element to a position on the optical axis between the first lens group and the second lens group and a position off the optical axis.

3. The laser machining head according to claim 2, wherein the first mover is configured to move the first lens group when the third mover moves the light flux conversion optical element.

4. The laser machining head according to claim 1, comprising
a third mover configured to move the light flux conversion optical element to a position on the optical axis between the first lens group and the second lens group and a position off the optical axis by rotating the light flux conversion optical element about an axis parallel to the optical axis.

5. The laser machining head according to claim 4, wherein the first mover is configured to move the first lens group when the third mover moves the light flux conversion optical element.

6. A laser machine comprising:

a light source configured to output laser light; and the laser machining head according to claim 1.

7. The laser machining head according to claim 1, comprising:

a third mover configured to move the light flux conversion optical element to a position on the optical axis between the first lens group and the second lens group and a position off the optical axis by inserting the light flux conversion optical element into the optical axis and retracting the light flux conversion optical element from the optical axis.

8. The laser machining head according to claim 1, wherein the laser machining head is configured to change the distance from the light emitter to the transfer position while maintaining a transfer magnification, by moving the first lens group and the third lens group.

9. The laser machining head according to claim 1, comprising:

a third mover configured to move the light flux conversion optical element to a position on the optical axis between the first lens group and the second lens group and a position off the optical axis by rotating the light flux conversion optical element about an axis perpendicular to the optical axis to the optical axis.

10. The laser machining head according to claim 1, wherein the laser machining head is configured to change a transfer magnification of the transfer optical system by moving the first lens group and the third lens group.

\*   \*   \*   \*   \*